April 7, 1964     G. P. McGRAW, JR     3,128,218
DEVICE FOR APPLYING PRESSURE SENSITIVE TAPE TO ARTICLES
Filed June 21, 1961     3 Sheets-Sheet 1

INVENTOR
G. P. McGRAW, JR.
BY
ATTORNEY

April 7, 1964  G. P. McGRAW, JR  3,128,218
DEVICE FOR APPLYING PRESSURE SENSITIVE TAPE TO ARTICLES
Filed June 21, 1961  3 Sheets-Sheet 2

INVENTOR
G. P. McGRAW, JR.
BY
A. C. Schwarz, Jr.
ATTORNEY

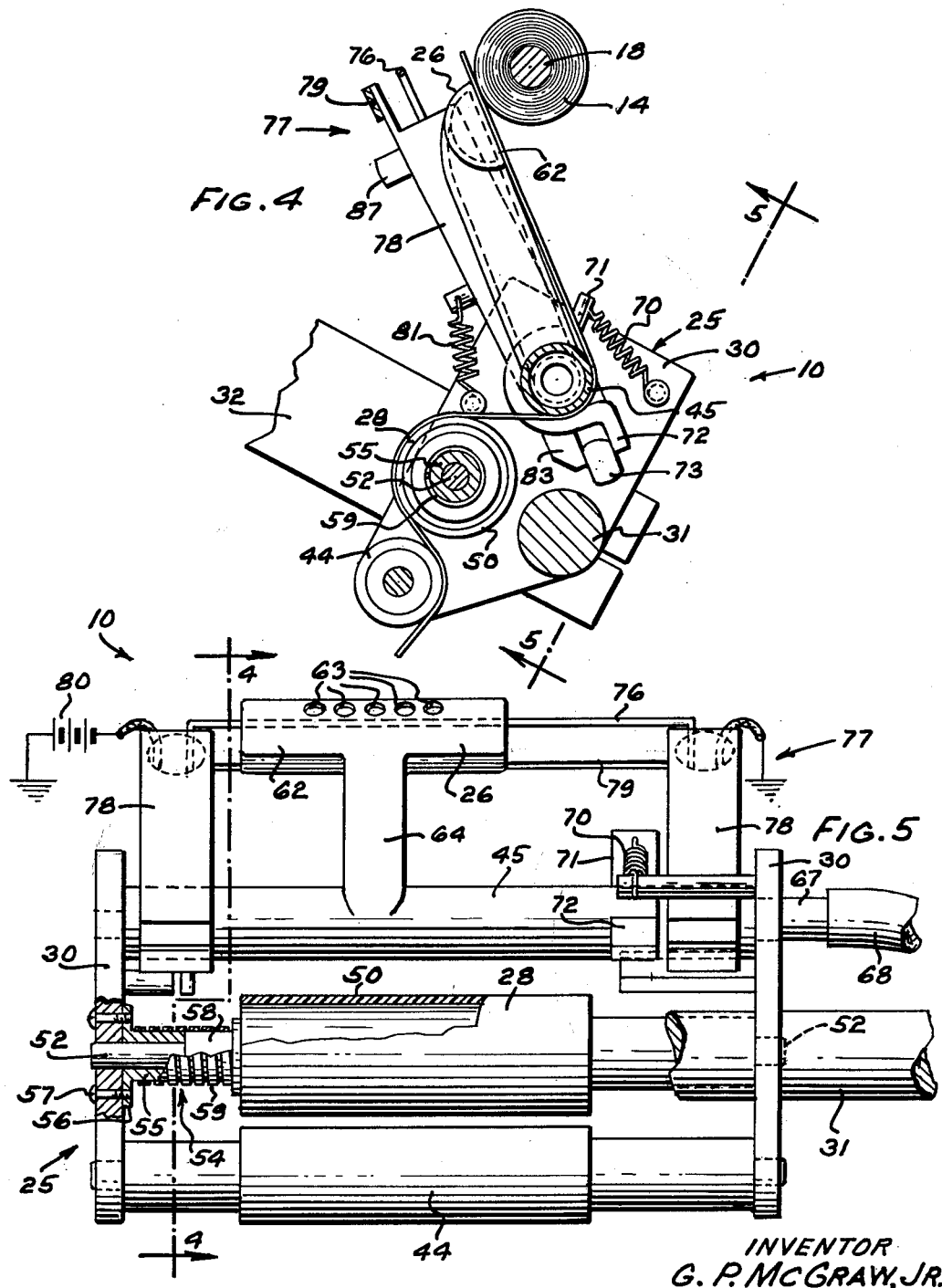

United States Patent Office 3,128,218
Patented Apr. 7, 1964

3,128,218
DEVICE FOR APPLYING PRESSURE SENSITIVE TAPE TO ARTICLES
George P. McGraw, Jr., Downers Grove, Ill., assignor to Western Electric Company, Incorporated, New York, N.Y., a corporation of New York
Filed June 21, 1961, Ser. No. 118,690
5 Claims. (Cl. 156—522)

This invention relates to a device for applying pressure sensitive tape to articles, and more particularly to a device mounted on a capacitor winding machine for wrapping pressure sensitive tape around wound capacitors.

An object of the present invention is to provide an improved device for applying pressure sensitive tape to articles.

Another object of the invention is to provide a device for wrapping pressure sensitive tape around wound capacitors.

Another object of the invention is to provide a device for withdrawing a portion of a pressure sensitive tape from a supply thereof, wrapping a portion of the tape around an article, and severing the wound tape from the supply.

With these and other objects in view, the invention contemplates the provision of a carrier having a gripping roller mounted thereon for rotation in one direction only and engageable with the tacky side of a pressure sensitive tape and having a suction head pivotally mounted thereon for releasably supporting the end portion of the tape. The carrier is mounted on a capacitor winding machine for movement along a predetermined path to a forward position adjacent a rotary arbor to advance the tape and press the tacky side of the end portion of the tape into adhering engagement with a capacitor wound on the arbor.

The arbor is then rotated to wind several convolutions of the tape onto the capacitor after which the carrier is retracted and moves relative to the tape. A holder pivotally mounted on the carrier for supporting a tape severing element is actuated by a stationary cam at a predetermined point during the return movement of the carrier to effect the severance of the wound portion of the tape from the supply thereof. The arbor is again rotated and a finger yieldably engaging the periphery of the wound tape presses the trailing end of the tape thereagainst.

Other objects, advantages and novel aspects of the invention will become apparent upon consideration of the following detailed description, in conjunction with the accompanying drawings, in which:

FIG. 4 is an enlarged fragmentary view showing a portion of the tape applying mechanism in advanced position and with the end of the strip of tape in engagement with a capacitor; and FIG. 5 is a fragmentary elevational view of the tape applying mechanism looking in the direction indicated by arrows 5—5 in FIG. 4 with portions of the mechanism broken away.

Figure 3:
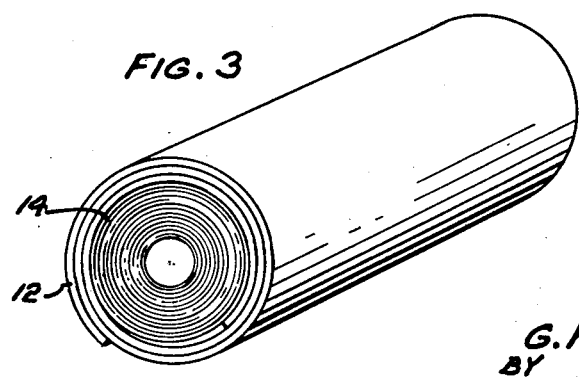
FIG. 3 is a perspective view of a wound capacitor with a protective covering of pressure sensitive tape wound therearound.

Referring to the drawings, the present tape applying device 10 is designed to apply pressure sensitive tape 12 to articles 14 (FIG. 3) to form a protective coating therearound. Preferably the pressure sensitive tape 12 comprises a strip of plastic material having adhesive applied to one side thereof. In the present instance, the article 14 is in the form of a condenser wound from a plurality of capacitor forming webs 16 (FIG. 1) onto an arbor 18 of a capacitor winding apparatus 20 to which the tape applying device 10 is attached. The arbor 18 is rotatably supported on a vertical frame plate 21 of the apparatus and is selectively driven by a suitable drive (not shown).

The tape applying device 10 includes a carrier 25 on which is mounted a suction head 26 for releasably holding the end portion of the tape 12 and a gripping roller 28 for effecting a gripping engagement with the tacky side of the tape 12 to feed the tape during the advancing movement of the carrier. The carrier 25 comprises a pair of plates 30 fixedly mounted on a rod 31 in parallel and laterally spaced relation to each other. The rod 31 is secured to one end of a lever arm 32, the other end of which is secured to a shaft 33 rotatably supported in the vertical frame plate 21.

At its other end, the shaft 33 has fixed thereto an arm 34 which is operatively connected to a piston rod 35 of a piston reciprocable within the cylinder of a fluid-operated actuator 37 mounted on the vertical frame plate 21. Fluid under pressure is admitted to opposite ends of the actuator 37 under control of a valve (not shown) to effect the movement of the carrier 25 through a predetermined distance to and from a normal retracted position shown in full lines in FIG. 1 and an advanced position adjacent to the arbor 18 indicated in dotted lines in FIG. 1 and in full lines in FIG. 4. Stops 39 (FIG. 1) engageable with the lever arm 32 limit the extent of movement of the carrier 25.

Figure 1:
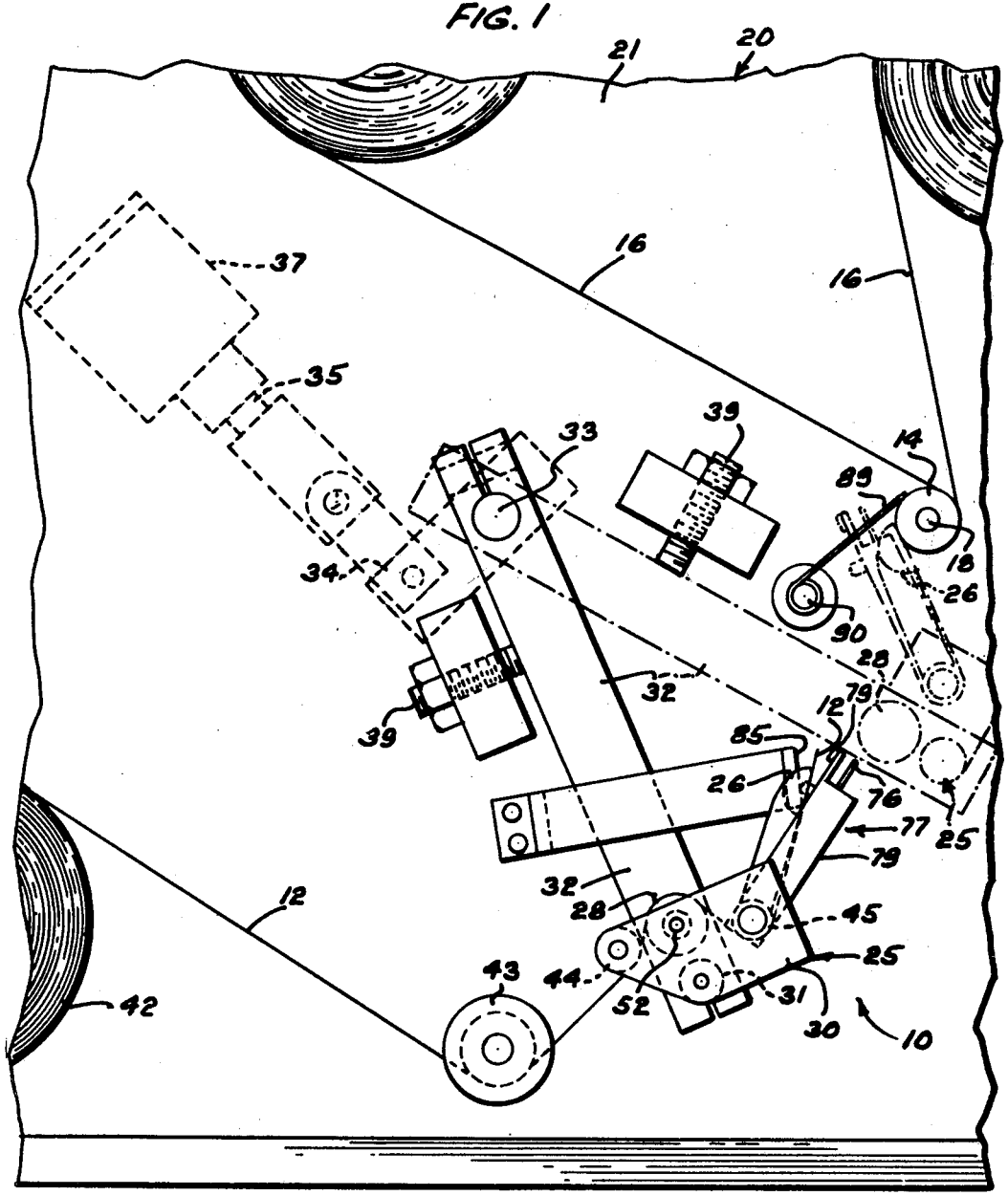
FIG. 1 is a fragmentary front view of a capacitor winding machine showing the tape applying device thereon.

As shown in FIG. 1, a strip of tape 12 is withdrawn from a supply roll 42 thereof suitably supported on the frame plate 21 and is guided around a flanged guide roller 43 on the frame plate 21 and around a guide roller 44, the roller 28 and a tubular member 45 on the carrier 25 and with the end portion of the tape releasably supported by the suction head 26. The roller 44 is rotatably supported in bearing apertures in the plates 30 of the carrier 25. It will be understood that during its advancing movement, the tape 12 engages the guide elements 43, 44 and 45 and the suction head 26 with the smooth side thereof and engages the roller 28 with the adhesive side thereof.

The roller 28 has fixedly secured thereto a sleeve 50 of plastic material such as polytetrafluoroethylene around a substantial peripheral portion of which sleeve the tacky side of the tape 12 engages to provide an effective gripping connection therewith for feeding movement of the tape. Opposite ends 52 of the roller 28 are reduced to provide trunnions 52 rotatably supported in bearing apertures in the planes 30 of the carrier. A one-way clutch 54 interconnects the roller 28 and the carrier to prevent rotation of the roller 28 during the advancing movement of the carrier 25 and the feeding of the tape and to permit free rotation of the roller during the return movement of the carrier.

The adhesion of the tape 12 to the plastic sleeve 50 of the roller 28 is such that with the tape wrapped around a substantial portion of the roller, an effective connection is provided between the tape and the roller to achieve the pulling of the tape from the supply roll 42 and the advancing of the tape during the forward movement of the carrier 25 and also to achieve the ready disengagement of the tape from the roll 28 during the return movement of the carrier.

In the embodiment shown herein, the clutch 54 comprises a sleeve 55 encircling a trunnion 52 of the roller 28 and having a flange 56 secured by fasteners 57 to the plate 30. The outer peripheral surface of the sleeve 55 is co-extensive with a cylindrical surface 58 on the roller 28 and around these cylindrical surfaces a helical spring 59 is mounted in engagement therewith. The spring 59 serves to grip the roller 28 and prevent rotation thereof in one direction during the advancing movement of the carrier 25, and to release the roller and permit free rotation thereof in the opposite direction during the return movement of the carrier.

The suction head 26 is in the form of a hollow member extending parallel to the roller 28 and having a flat wall 62 engageable with the smooth side of the tape 12. The wall 62 is provided with a plurality of apertures 63 (FIG. 5) through which suction is applied to the tape to releasably hold the tape onto the suction head. A tubular stem 64 extends from the suction head 26 to the tubular member 45. One end of the tubular member 45 is closed and provided with a trunnion 66 pivotally supported in one of the plates 30 of the carrier 25 and the other end of the tubular member 45 is provided with a reduced tubular extension 67 pivotally supported in the other plate 30. To provide a suction for the head 26 it is connected to a vacuum line by means of a flexible tubing 68 which is attached to the tubular extension 67.

As viewed in FIG. 4, the suction head 26 is stressed for pivotal movement in a clockwise direction about the axis of the tubular member 45 by a spring 70. One end of the spring is fixed to a plate 30 of the carrier 25 and the other end is connected to a member 71 fixed to and encircling a portion of the tubular member 45. A laterally extending end portion 72 of the member 71 cooperates with a stop 73 on the plate 30 for stopping the suction head 26 in a predetermined operative position on the carrier.

From the foregoing description of the mechanism thus far described, it will be understood that during the advance movement of the carrier 25, the tape gripping roller 28 is held by the clutch 54 against rotation and serves to effect a connection with the tape and advance it with the carrier, and that the suction head 26 releasably supports the end portion of the tape and carries it with the sticky side thereof into adhering engagement with the periphery of the wound capacitor 14 on the arbor 18 as shown in FIG. 4. With the end portion of the tape 12 adhering to the wound capacitor 14, the arbor 18 is rotated to wind several convolutions of the tape onto the capacitor, after which the arbor is stopped and the actuator 37 is operated to return the carrier 25 to its retracted position. During this return movement of the carrier, the tape 12 is held by the capacitor 14 on the arbor 18 against movement and the suction head 26, the gripping roller 28 and the guide roller 44 move relative to the tape, the rollers 28 and 44 rotating about their axes.

Mechanism is provided for severing the section of tape 12 wrapped around the capacitor from the supply of tape during the return movement of the carrier 25 to the retracted position. The tape severing mechanism includes a wire 76 (FIGS. 4 and 5) heated to incandescence and movable across the tape 12 as the carrier 25 moves away from the arbor 18. The severing wire 76 is supported parallel to the rollers 28 and 44 on the carrier and for movement transversely of the tape 12 beyond the end of the suction head 26 by a holder 77 which is mounted on the carrier 25 for movement therewith and for limited pivotal movement relative thereto.

The holder 77 comprises a pair of laterally spaced parallel arms 78 disposed on opposite sides of the suction head 26 and pivotally supported at one end thereof on the tubular member 45. At their outer ends, the arms 78 are connected together by a cross bar 79 and are provided with recesses in which connector members are mounted in insulated relation to the arms for supporting the wire 76 and establishing electrical connections therewith and a suitable source of current 80. The holder 77 serves to carry the severing wire 76 from one position to another on opposite sides of the tape 12 and is urged to a normal position on one side of the tape as indicated in FIG. 4 by a spring 81 connected at one end to the holder and at the other end to the carrier 25. An extension 83 on one of the arms 78 is engageable with the stop 73 on the carrier to stop the holder 77 in one position (FIG. 4).

At a predetermined point during the return movement of the carrier 25, the holder 77 is engaged by a stationary cam 85 (FIGS. 1 and 2) and is actuated thereby about the axis of the tubular member 45 in a clockwise direction to move the heated wire 76 from one side to the other of the tape 12 extending from the capacitor 14 to the carrier 25 to effect the severance of the tape adjacent to the capacitor. The cam 85 is formed by a bar fixedly mounted on the vertical frame plate 21 and cooperates with a cam follower 87 projecting laterally from the end of one of the arms 78 of the holder 77.

During the advancing movement of the carrier, the holder 77 and the heated wire 76 are moved by the spring 81 from a position on the right-hand side of the tape as viewed in FIGS. 1 and 4 to a position on the left-hand side thereof across the end of the tape 12, and during the return movement of the carrier 25, the wire 76 is moved from the left-hand side of the tape by means of the cam 85 to effect the cutting of the tape 12 and the severance of the wound portion thereof from the supply.

Figure 2:
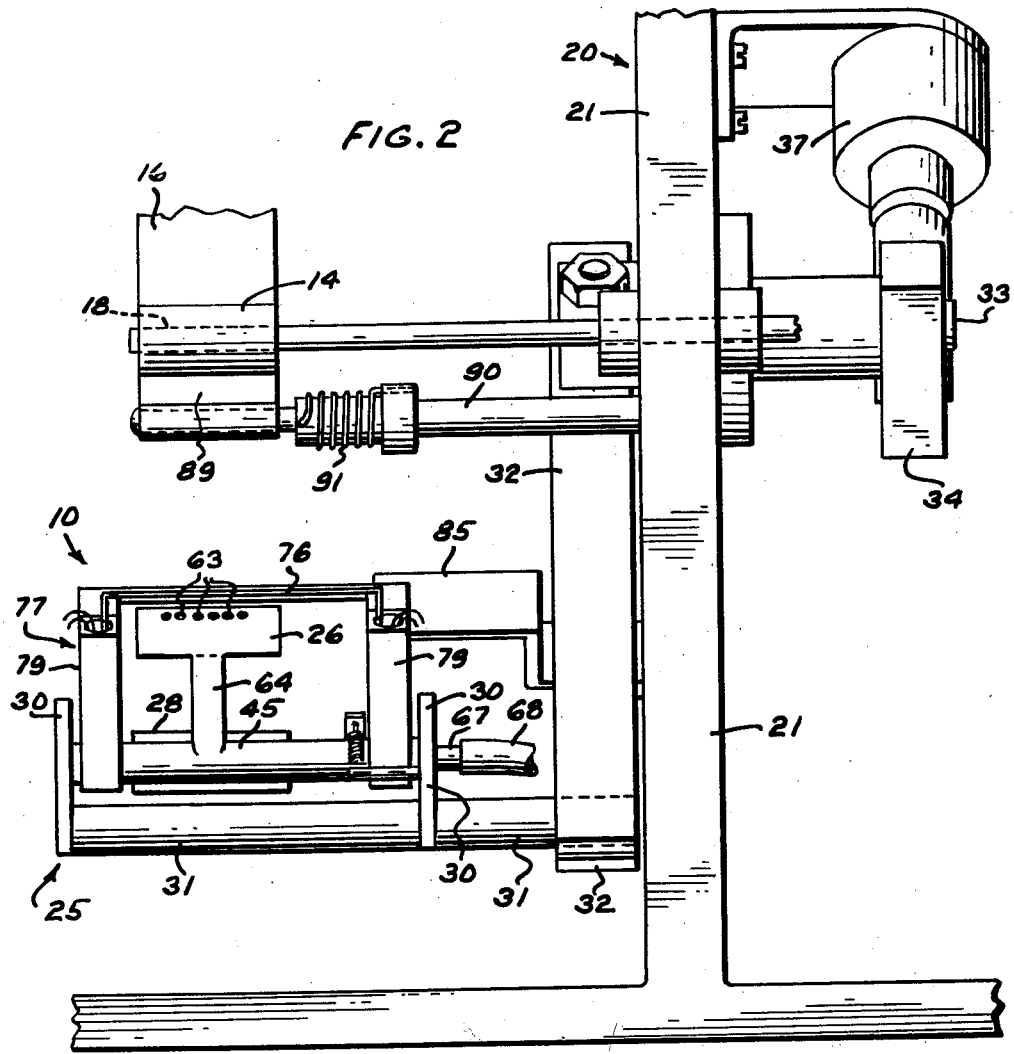
FIG. 2 is a fragmentary side view of the apparatus looking from the right as viewed in FIG. 1.

The arbor 18 is then rotated to cause the trailing end of the tape to be pressed against the underlying convolution thereof by a flat presser plate 89 which is pivotally mounted on a rod 90 secured to the vertical frame plate 21 and is stressed for movement in a clockwise direction as viewed in FIG. 1 by a torsion spring 91 (FIG. 2).

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A device for applying pressure sensitive tape to an article supported in a predetermined position comprising a carrier, means for imparting forward and return movements to said carrier along a predetermined path to and from an advanced position adjacent to the article, means on said carrier engageable with the adhesive side of the tape for effecting a connection therewith to advance the tape during the forward movement of said carrier and to release the connection with the tape during the return movement of said carrier, suction means on said carrier for releasably supporting the end portion of the tape and for guiding said end portion into adhesive engagement with the article in response to movement of said carrier to the advanced position, tape severing means mounted on said carrier, and means for actuating said tape severing means in response to return movement of said carrier to effect the severance of the tape adjacent to the article.

2. In a device for applying pressure sensitive tape to an article supported in a predetermined position, a carrier, means for imparting forward and return movements to said carrier along a predetermined path to and from an advanced position adjacent to the article, a roller engageable with the adhesive side of the tape, means for mounting said roller on said carrier for rotation in one direction only for effecting a feeding connection with and advancement of the tape during the forward movement of said carrier and for releasing the feeding connection with the tape during the return movement of said carrier, a suction member mounted on said carrier for releasably supporting the end portion of said tape and for carrying the end portion of the tape into adhering engagement with the article in response to movement of said carrier to the advanced position, a tape severing element, a holder for said tape severing element pivotally mounted on said carrier for guiding said tape severing element across the path of the tape adjacent to said suction member, a resilient means on said carrier for moving said holder to a first position on said carrier with said tape severing element on one side of the tape, and means for actuating said holder to a second position with said tape severing element on the other side of the tape in response to return movement of said carrier to effect the severance of the tape.

3. In a device for applying pressure sensitive tape to an article supported in a predetermined position, a carrier, means for imparting forward and return movements to said carrier along a predetermined path to and from an advanced position adjacent to the article, means on said carrier for effecting the feeding of the tape and the adhesive engagement of the tape with the article in response to forward movement of said carrier to said advanced position and for releasing said tape for movement relative thereto during the return movement of said carrier, a tape severing element, a holder pivotally mounted on said carrier for movement to and from first and second positions for supporting said tape severing element for movement across the path of the tape, resilient means on said carriage for moving said holder to said first position, and means operable at a predetermined portion of the return movement of said carrier for actuating said holder to said second position to effect the severance of said tape.

4. In a device for applying pressure sensitive tape to an article supported in a predetermined position, a carrier, means for imparting forward and return movements to said carrier along a predetermined path to and from an advanced position adjacent to the article, means on said carrier for effecting the feeding of the tape and the adhesive engagement thereof with the article in response to forward movement of said carrier to said advanced position and for releasing said tape for movement relative thereto during the return movement of said carrier, a wire for severing the tape, means for heating said wire, a holder pivotally mounted on said carrier for movement to and from first and second positions thereon for supporting said wire for movement across the path of the tape, resilient means on said carriage for moving said holder to said first position, and means operable in response to the return movement of said carrer for actuating said holder to said second position to effect the severance of said tape.

5. In a machine having an arbor for winding capacitors thereon, the combination therewith of a device for wrapping pressure sensitive tape onto a capacitor on the arbor comprising a carrier, means for imparting forward and return movements to said carrier along a predetermined path to and from an advanced position adjacent to the arbor and the capacitor wound thereon, a roller engageable with the adhesive side of said tape, means for mounting said roller on said carrier for rotation in one direction only to effect a connection with and the advancement of the tape during the forward movement of said carrier and to release the feeding connection with the tape during the return movement of said carrier, a suction member connected to a source of suction for releasably supporting the end portion of the tape, means for mounting said suction member on said carrier for limited pivotal movement, resilient means on said carrier for urging said suction member for pivotal movement to a normal position to guide the tape into adhering engagement with the capacitor in response to movement of said carrier to the advanced position, a tape severing element, a holder for said tape severing element pivotally mounted on said carrier for guiding said element across the path of the tape adjacent to said suction member, resilient means on said carrier for moving said holder to a first position with said element on one side of the tape, and means for actuating said holder to a second position with said tape severing element on the other side of the tape in response to return movement of said carier to effect the severance of the tape.

References Cited in the file of this patent

UNITED STATES PATENTS

| | | |
|---|---|---|
| 1,207,068 | Pagliarul | Dec. 5, 1916 |
| 2,454,844 | Sharpe | Nov. 30, 1948 |
| 2,776,068 | Johnson | Jan. 1, 1957 |